United States Patent [19]

Omura et al.

[11] 4,127,782
[45] Nov. 28, 1978

[54] AUTOMOTIVE POWER SUPPLY

[75] Inventors: Morikazu Omura; Yukio Okuda, both of Tokyo, Japan

[73] Assignee: Sawafuji Electric Co., Ltd., Tokyo, Japan

[21] Appl. No.: 639,620

[22] Filed: Dec. 10, 1975

[30] Foreign Application Priority Data

Sep. 18, 1975 [JP] Japan .............................. 50-112982
Sep. 20, 1975 [JP] Japan .............................. 50-113826
Sep. 18, 1975 [JP] Japan .............................. 50-1129983
Dec. 30, 1975 [JP] Japan .............................. 51-263

[51] Int. Cl.² .................... H01M 10/46; H01M 10/48
[52] U.S. Cl. .................... 307/10 R; 307/66; 320/6; 320/50
[58] Field of Search .............. 320/6, 7, 15, 16, 17, 320/18, 48, 22, 47, 50; 307/10 R, 66, 150

[56] References Cited

U.S. PATENT DOCUMENTS

| | | | |
|---|---|---|---|
| 3,044,023 | 7/1962 | Floyd | 307/66 |
| 3,134,940 | 5/1964 | Massey | 320/18 |
| 3,671,843 | 6/1972 | Huntzinger | 320/15 |
| 3,763,415 | 10/1973 | Ownby | 320/6 |
| 3,771,012 | 11/1973 | Niederjohn | 307/66 |
| 3,829,753 | 8/1974 | Marshall | 320/6 |
| 3,836,815 | 9/1974 | Herzog | 307/66 |
| 3,949,289 | 4/1976 | Day | 320/6 |

Primary Examiner—Robert K. Schaefer
Assistant Examiner—William L. Feeney

[57] ABSTRACT

An automotive power supply comprising a generator which produces a voltage when an engine is in operation, a main battery which drives a starter motor, an auxiliary battery which functions as a power source for direct current equipment in a vehicle, and a d-c voltage booster circuit which boosts the voltage produced in the generator to supply the auxiliary battery; wherein, in charging the main and auxiliary batteries in parallel by the voltage produced in the generator, the supply voltage to the auxiliary battery is boosted by compensating the line voltage drop between the generator and the auxiliary battery.

16 Claims, 14 Drawing Figures

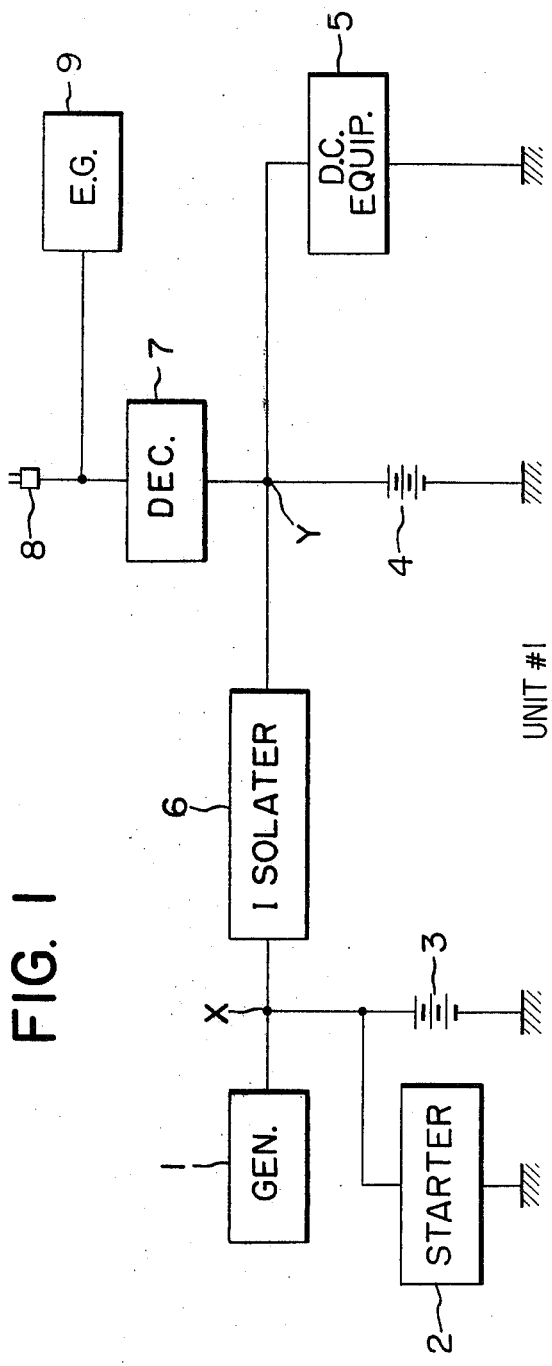
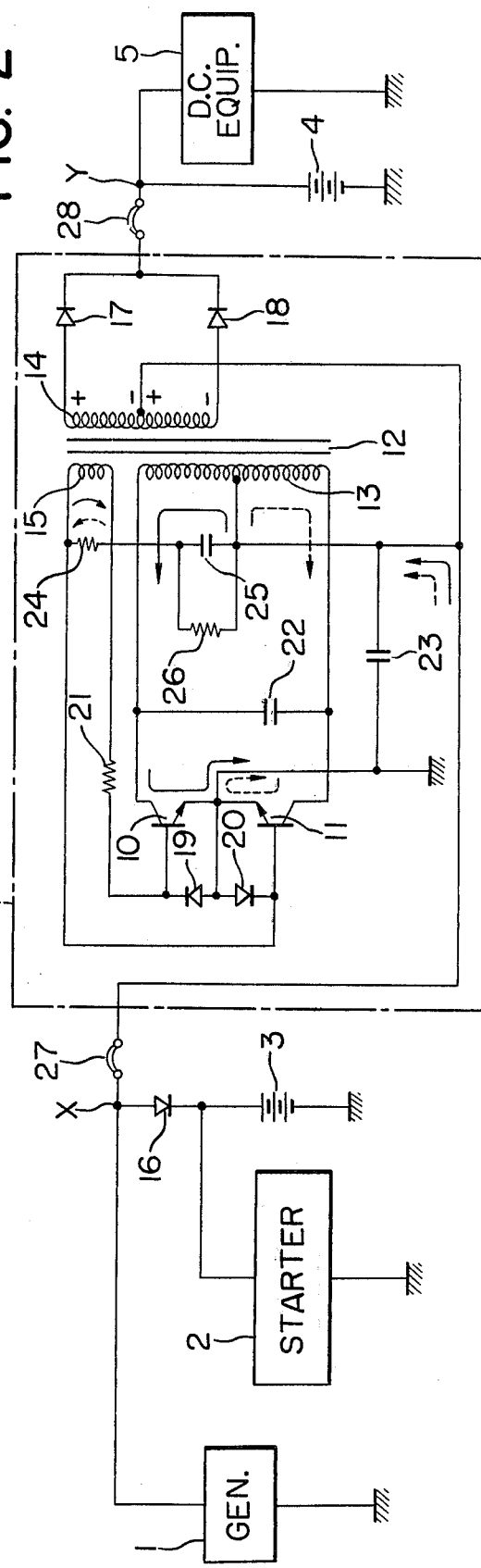

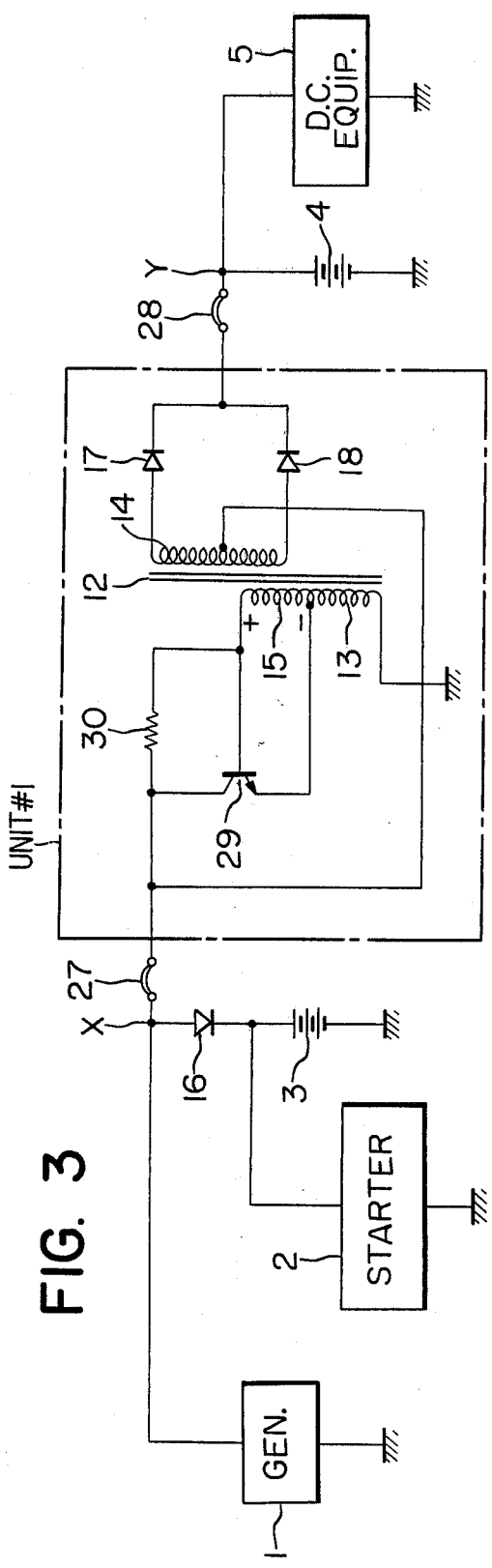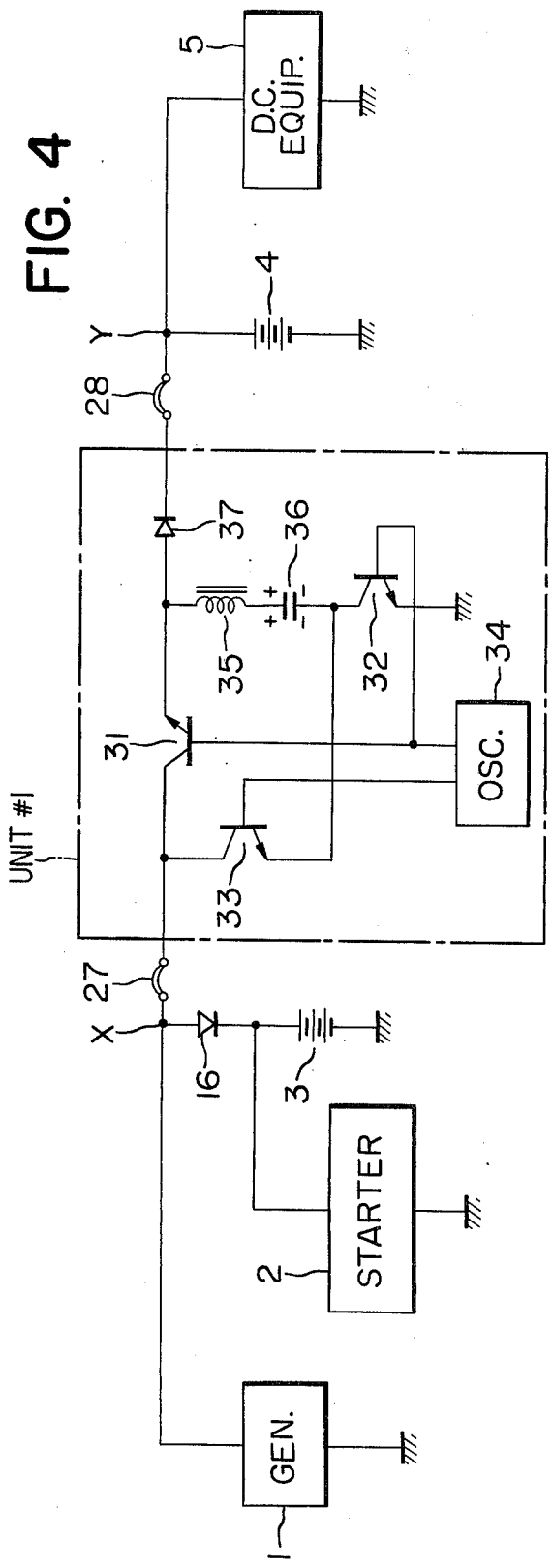

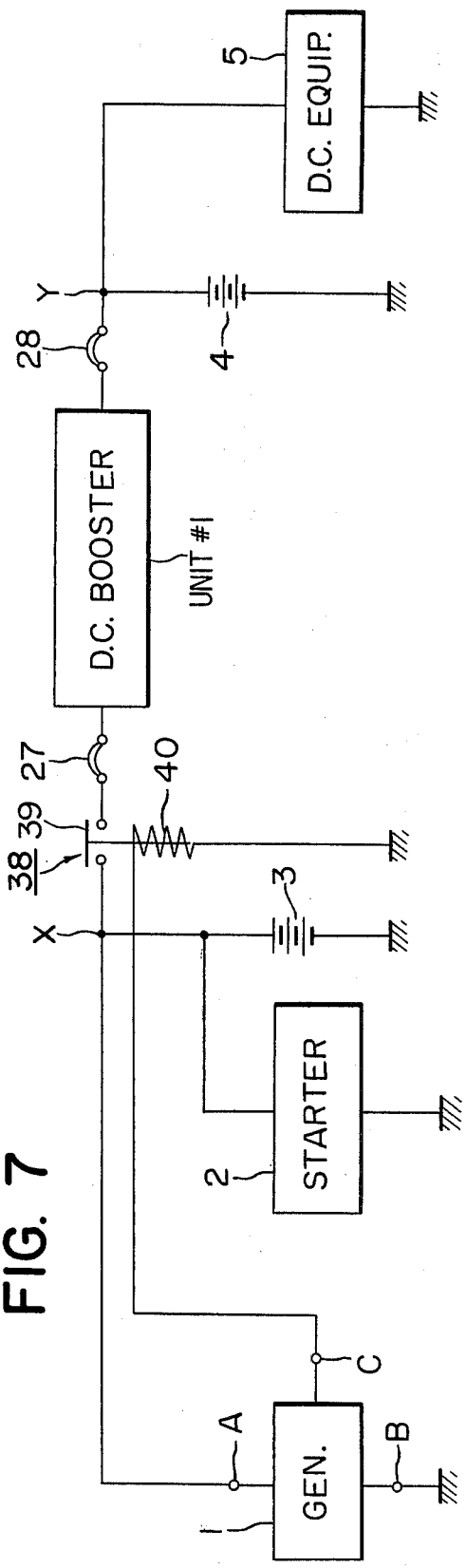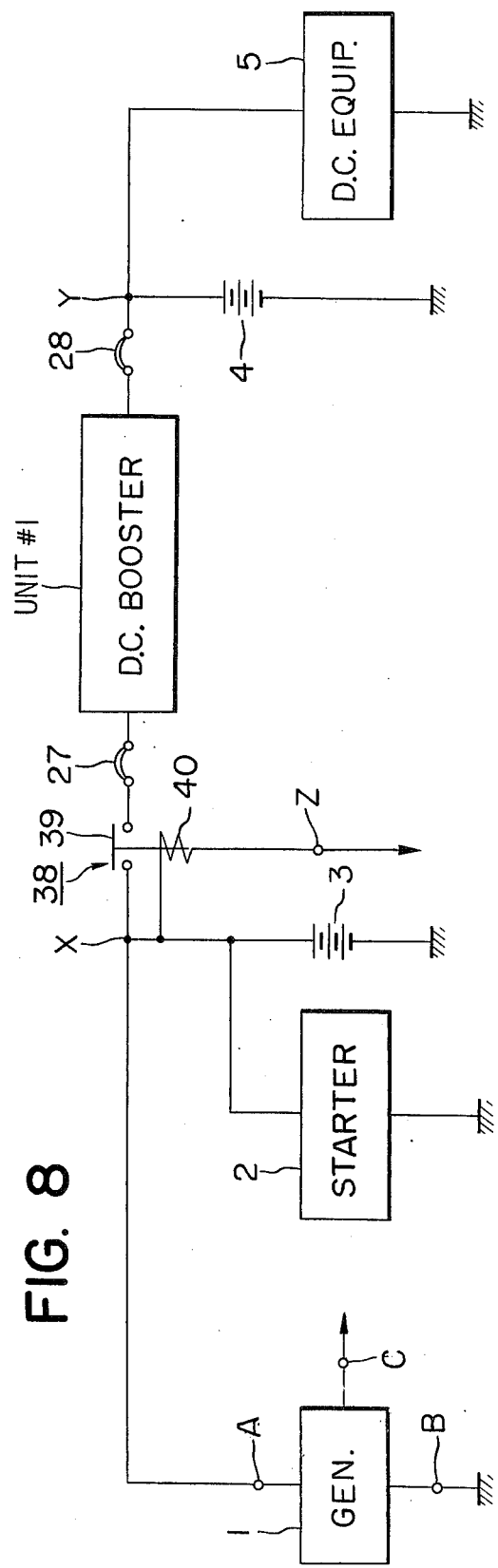

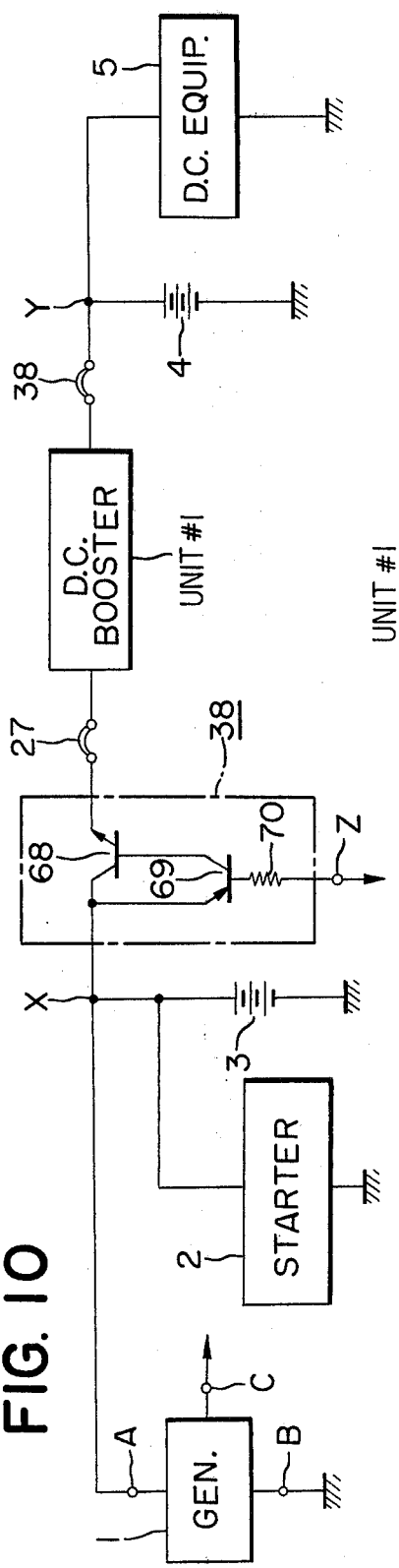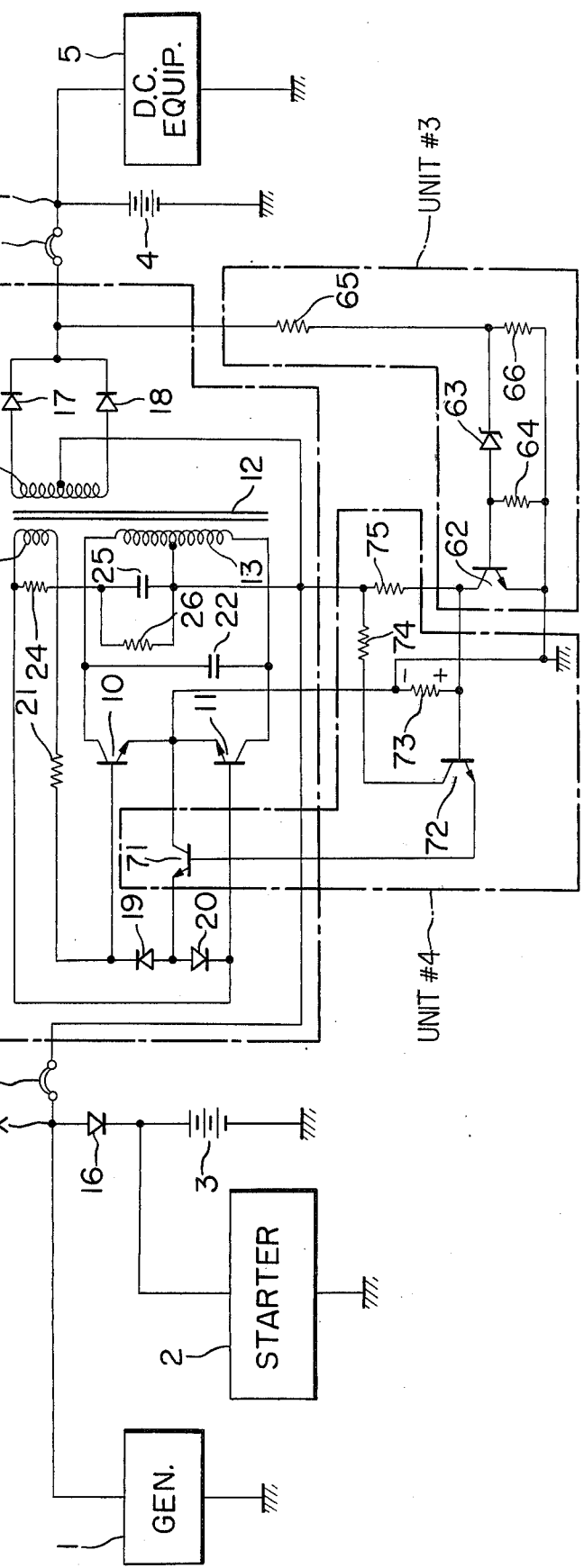

4,127,782

AUTOMOTIVE POWER SUPPLY

BACKGROUND OF THE INVENTION

1. Field of the Invention

This invention relates generally to an automotive power supply, and more specifically to an automotive power supply which is designed to boost the supply voltage to an auxiliary battery, in charging main and auxiliary batteries in parallel by a generator which produces a voltage when an engine is in operation, by compensating the line voltage drop between the generator and the auxiliary battery.

2. Description of the Prior Art

Most conventional types of power supplies used in automobiles for leisure purpose such as mobile homes, tent trailers, camping cars, etc. are generally equipped with a generator 1 producing a voltage when an engine is in operation, a main battery 3 for driving a starter motor 2, and an auxiliary battery 4 which serves as a power source for d-c electric equipment 5 in the automobile such as a pump motor, lighting, a refrigerator, etc., as shown in FIG. 1, having such a construction that the main and auxiliary batteries 3 and 4 are charged in parallel by the generator 1 when the engine is in operation, and that an isolator 6 comprising, for example, diodes is provided between the main and auxiliary batteries 3 and 4 to ohmically disconnect the electric circuit to prevent load of automotive electric equipment from being applied to the main battery 3, when an engine is stopped. Assuming the automotive d-c equipment 5 have a total rated current of approx. 10A, and a charging current of approx. 20 A is supplied to the auxiliary battery 4 in this type of automotive power supply, a current of approx. 30 A is required to be supplied from the generator 1. However, the auxiliary battery 4 is usually located near the automotive d-c equipment 5 mounted in the container of a trailer, about 5 to 10 m distant from the main battery 3, so that the voltage generated in the generator 1 suffers a considerable voltage drop over the distance to the auxiliary battery 4, with the consequence that only a current of approx. 10 A is supplied to the auxiliary battery 4 and the automotive d-c equipment 5. In other words, the feeding efficiency from the generator 1 to the auxiliary battery 4 and the automotive d-c equipment 5 is lowered by the voltage drop. In addition, the charging efficiency of the auxiliary battery 4 is also deteriorated to such an extent that the auxiliary battery 4 cannot be charged to a desired voltage level. Particularly when a refrigerator and other equipment which is continuously operated are equipped in the automobile, the auxiliary battery 4 can hardly be charged. In view of this, conventional types of automotive power supplies usually have such a construction that the auxiliary battery 4 is charged from the commercial a-c power 8 using a rectifier 7, or an engine generator 9 is equipped independently of the generator 1 to supply sufficient current to the auxiliary battery 4 and the automotive d-c equipment 5 by supplementing a voltage equivalent to the voltage drop between the two batteries 3 and 4. However, because engine generators are generally large in size and expensive, they cannot suitably be used in small cars. Therefore, it is desired to provide a device which is able to sufficiently charge an auxiliary battery and which is less expensive then the conventional engine generator.

SUMMARY OF THE INVENTION

An object of this invention is to provide an automotive power supply which solves the above-mentioned problems.

Another object of this invention is to provide an automotive power supply which boosts the supply voltage to the auxiliary battery to charge the auxiliary battery to a desired level by using a d-c booster circuit which is smaller in size and approx. 1/50 in price compared with the above-mentioned engine generator.

A further object of this invention is to provide an automotive power supply which is designed to prevent damage from possible overcharging of the auxiliary battery that may be caused by the above-mentioned d-c booster circuit.

It is a still further object of this invention to provide an automotive power supply which prevents possible burn-out of the d-c booster circuit in case the load current exceeds the rated value by providing the d-c booster circuit with a drooping characteristic.

An even further object of this invention is to provide an automotive power supply which discontinues the supply of power from the main battery to the automotive d-c equipment, when the engine is stopped, by utilizing the voltage generated in the generator to control an isolating means which is provided between the main battery and the d-c booster circuit and is operated by an external controlling means.

BRIEF DESCRIPTION OF THE DRAWINGS

FIG. 1 is a schematic block diagram showing an example of known automotive power supply devices.

FIGS. 2 through 5, FIGS. 7 and 11 are general schematic diagrams of an embodiment of this invention, FIGS. 8 and 10 are partial schematic diagrams of an embodiment of the present invention.

DETAILED DESCRIPTION OF PREFERRED EMBODIMENT

Figure 5:
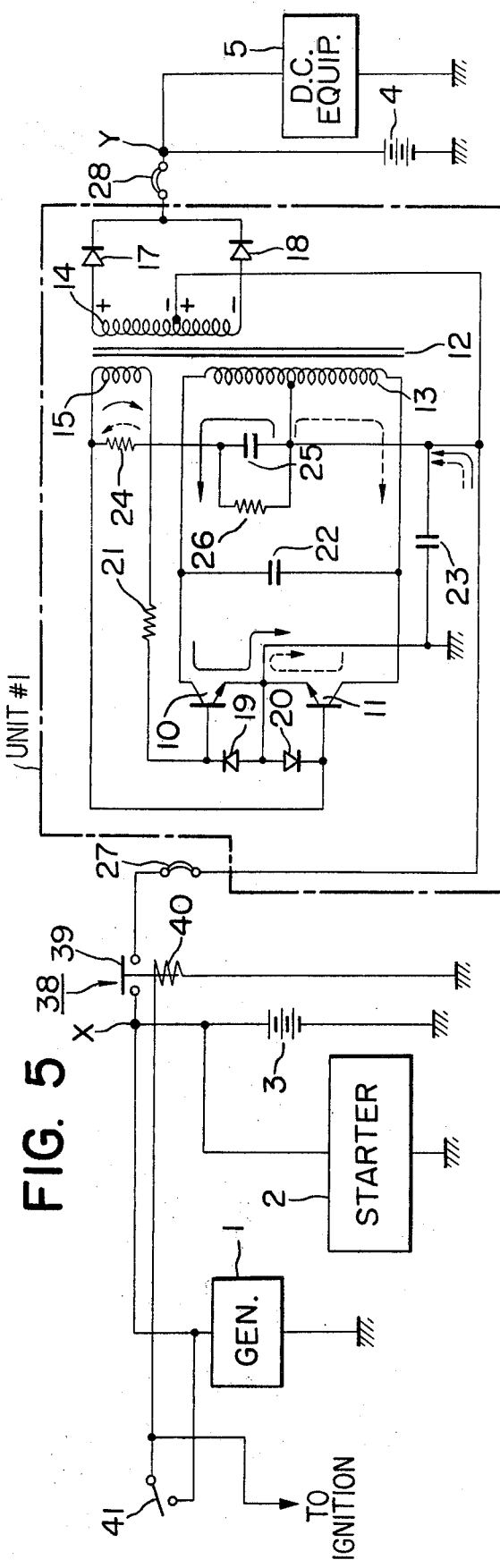

FIG. 2 is a general schematic diagram of an embodiment of this invention showing a d-c booster circuit provided between the main battery 3 and the auxiliary battery 4 in FIG. 1.

In FIG. 2, #1 unit is a d-c booster circuit provided in accordance with the present invention, numerals 10 and 11 refer to transistors which repeat ON and OFF operations alternately, 12 is a transformer on which a primary winding 13, a secondary winding 14 and a feedback winding 15 are wound, 16 through 18 are diodes which act as an isolater 6 in FIG. 1. Numerals 19 and 20 refer to diodes connected between the base and emitter of transistors 10 and 11. 21 is a controlling resistor, 22 and 23 are capacitors, 24 is a starting resistor, and 25 is a capacitor. Capacitors 22, 23 and 25 are used for absorbing surge voltage, spike voltage and radio noise, respectively. Resistor 26 is for discharging the charge built up in the capacitor 25 by surge voltage, etc. 27 and 28 are breakers which prevent large current from flowing, in case the main and auxiliary batteries are connected to reverse-polarity to protect circuit components, particularly semiconductor elements. Other numerals refer to those represented by corresponding numerals in FIG. 1.

Assuming the generator 1 is in steady operation while the transistor 10 is in ON state and the transistor 11 is in OFF state, then the circuit current flows in the direction of the arrows shown by solid line in the figure. When flux change decreases in the core of the transformer 12, induced voltage in the feedback winding 15 tends to be diminished, and the base current supplied to the transistor 10 is decreased. Consequently, the current flowing in the primary winding 13 in the direction of the arrows shown in solid line is reduced. The decrease of this current induces in the feed back winding 15 a voltage having the opposite polarity against the induced voltage when the above transistor 10 has been in ON state. In other words, as soon as the transistor 10 shifts to OFF state, current begins to flow in the feedback winding 15 in the direction of the arrows shown by broken line, and thereby the transistor 11 begins to shift from OFF state to ON state. That is, a circuit current flows in the direction of the arrows shown by broken line in the figure. In this way, similar operations are repeated, and a current flowing in the direction of the arrows shown by solid line and a current flowing in the direction of the arrows shown by broken line are alternately and repeatedly supplied to the primary winding 13. That is, an oscillation occurs.

In this way, when an alternating current is supplied to the primary winding 13, an alternating voltage is induced in the secondary winding 14 of the transformer 12. For example, when the induced voltage has a polarity shown in the figure, the diode 17 is conducting. Therefore, the voltage on the terminal Y in the figure, or the supply voltage to the auxiliary battery 4 is a sum of the voltage on the center tap of the secondary winding 14 and the voltage induced in the upper part in the figure of the secondary winding 14. On the other hand, when a voltage having the opposite polarity to that shown in the figure is induced in the secondary winding 14, the diode 18 becomes conducting. Thus, the supply voltage to the auxiliary battery 4 becomes a sum of the center tap voltage of the secondary winding 14 and the voltage induced in the lower part in the figure of the secondary winding 14. Consequently, the supply voltage to the auxiliary battery 4 is boosted to a desired level by selecting the winding ratio of the primary and secondary windings 13 and 14.

On the other hand, when the engine is stopped, the main battery 3 is ohmically disconnected from the auxiliary battery 4 by the diodes 16, 17 and 18 to prevent the main battery 3 from unwantedly supplying the power to the automotive d-c equipment 5.

FIG. 3 shows another embodiment of the present invention. In the figure, numeral 29 refers to a transistor repeatedly turning on and off, 30 to a base resistor, and other numerals to those represented by corresponding numerals in FIG. 2.

When the engine is operated and the generator 1 produces a voltage, the base current is fed to the transistor 29 via the base resistor 30, bringing the transistor 29 to ON state, and thereby current is fed to the primary winding 13 through the transistor 29. This induces in the feedback winding 15 a voltage having a polarity shown in the figure, which in turn increases the base current of the transistor 29. As a result, the collector current of the transistor 29 and therefore the induced voltage in the feedback winding 15 increase, and the current flowing in the primary winding 13 also increases.

In the course of time, when the flux change in the core of the transformer 12 approaches to zero, the induced voltage in the feedback winding 15 tends to diminish, and the base current of the transistor 29 also decreases. As the result, current flowing in the primary winding 13 is reduced, and thereby a voltage having the opposite polarity against the polarity shown in the figure is induced in the feedback winding 15, thus bringing the transistor 29 to OFF state. In this way, when the transistor 29 is turned to OFF state, the base current again begins to flow in the transistor 29 via the base resistor 30, thereby the transistor 29 is brought to ON state again. The above-mentioned operations are repeated, and current to the primary winding 13 alternately increases and decreases. That is, an alternating current is supplied to the primary winding 13. As a result, an alternating voltage is generated in the secondary winding 14, and the supply voltage to the auxiliary battery 4 is boosted.

On the other hand, when the engine is stopped, the main and auxiliary batteries 3 and 4 are ohmically isolated by the diodes 16, 17 and 18.

In the embodiment shown in FIG. 3 which uses only one transistor, a smaller unit can be manufactured at lower cost compared with the embodiment in FIG. 2.

FIG. 4 illustrates an embodiment of the present invention in which the d-c booster circuit is formed by a separately excited inverter. In the figure, numerals 31, 32 and 33 refer to transistors, 34 to an oscillator as shown conceptually which operates, when the generator 1 produces voltage, to turn on and off the transistors 31 and 32 and the transistor 33 alternately. Numeral 35 refers to a choke coil, 36 to a capacitor, 37 to a diode, and other numerals to those represented by corresponding numerals to FIG. 2.

Assuming the generator 1 generates voltage, and the transistors 31 and 32 are turned from OFF state to ON state by the oscillator 34 while the transistor 33 is shifted from ON state to OFF state, a closed circuit consisting of the generator 1, the transistor 31, the choke coil 35, the capacitor 36 and the transistor 32 is formed, with the capacitor 36 being charged in a polarity shown in the figure based on the time constant determined by the circuit elements.

Next, when the oscillator 34 turns off the transistors 31 and 32 and turns on the transistor 33, the supply voltage to the auxiliary battery 4 or the potential on the terminal Y in the figure becomes a sum of the voltage on the terminal X in the figure and the charged voltage in the capacitor 36 at that moment as long as the voltage drop across the terminals X and Y is not taken into account. Thus, the capacitor 36 begins to be discharged.

Subsequently, when the oscillator 34 again turns on the transistors 31 and 32 and turns off the transistor 33, the capacitor 36 is again charged. In this way, the above-mentioned operations are repeated and the supply voltage to the auxiliary battery is boosted.

When the engine is stopped, the electric circuit between the main and auxiliary batteries is disconnected by the diode 37.

In this embodiment, the oscillator 34 is used in forming the d-c booster circuit #1 unit with a separately excited inverter, but in this case the boosting transformer as used in the embodiments in FIGS. 2 and 3 can be eliminated, so that the unit can be reduced in size.

FIG. 5 shows an embodiment of this invention which uses a relay circuit 38, which is controlled by an ignition switch, in place of the diode 16 which constitutes an isolating means in the embodiment in FIG. 2.

In FIG. 5, numeral 38 is a relay circuit constituting an isolating means which is provided between the main battery 3 and the d-c booster circuit #1 unit to make and break the electric circuit between the main and auxiliary batteries 3 and 4. 39 is a relay contact, 40 is a relay winding one end of which is connected to an ignition switch 41 and the other end of which is grounded. 41 is an ignition switch one end of which is connected to the relay winding 50 and an ignition device (not illustrated), and the other end of which is connected to the generator 1. Other numerals refer to those represented by corresponding numerals in FIG. 2.

When the ignition switch 41 is turned on and the engine starts its revolution, the generator 1 is driven to generate voltage. At the same time, current is supplied to the relay winding 40 via the ignition switch 41, and the contact 39 is made to close the electrical circuit between the main and auxiliary batteries 3 and 4.

Meanwhile, when the ignition switch 41 is changed over from ON state to OFF state, the relay contact 39 which has been in ON state is turned off since the current to the relay winding 40 stops to flow.

Figure 6:
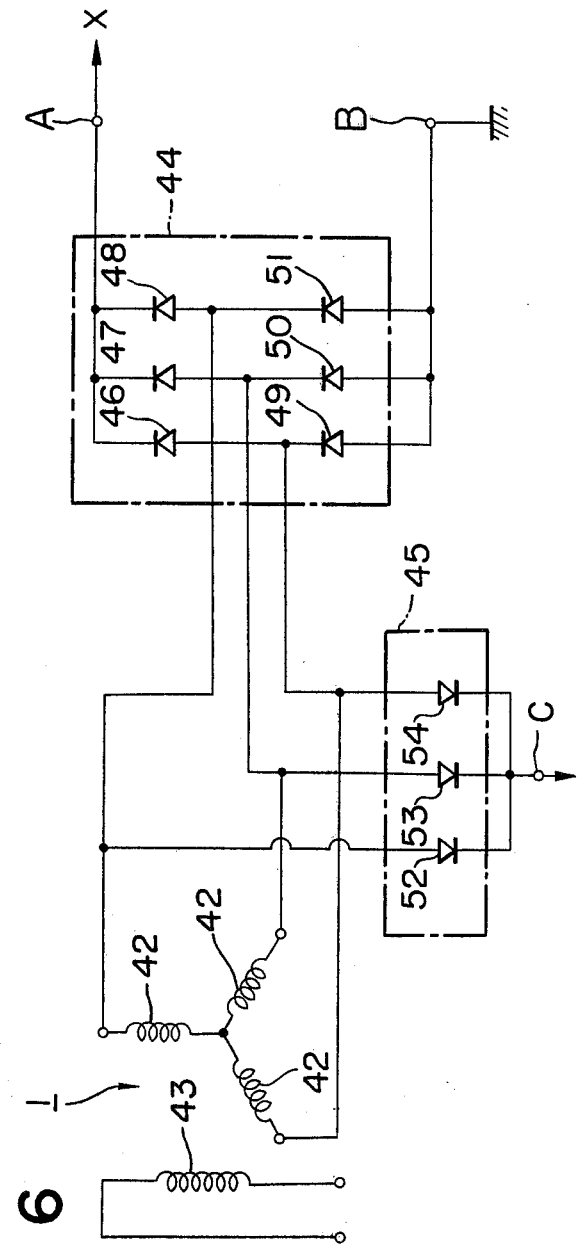
FIG. 6 is a typical circuit diagram of a generator applicable to each embodiment of FIGS. 7, 8 and 10.

FIG. 6 is a schematic circuit diagram showing a portion of a generator 1 which is applicable to each embodiment of this invention shown in FIGS. 7, 8 and 10.

In FIG. 6, numeral 42 refers to armature windings, 43 to a field winding, 44 to a first rectifying circuit consisting of diodes 46 through 51. 45 is a second rectifying circuit consisting of diodes 52 through 54.

FIG. 7 shows an embodiment of this invention in which the generator 1 shown in FIG. 6 is used and the output terminal C in the figure is connected to the relay winding 40. Numerals in the figure correspond with like numerals in FIGS. 2 and 5.

When the engine is operated and voltage is generated in the armature windings 42 (FIG. 6) of the generator, then a d-c voltage rectified by the second rectifier circuit 45 (FIG. 6) is applied to the output terminal C of the generator 1. Consequently, the relay contact 39 is closed by the current fed to the relay winding 40.

When the engine is stopped, the generator 1 also stops the generation of voltage and current stops flowing from the output terminal C of the generator to the relay winding 40. Consequently, the relay contact 39 is opened and the electric circuit between the main and auxiliary batteries 3 and 4 is disconnected.

Figure 9A:
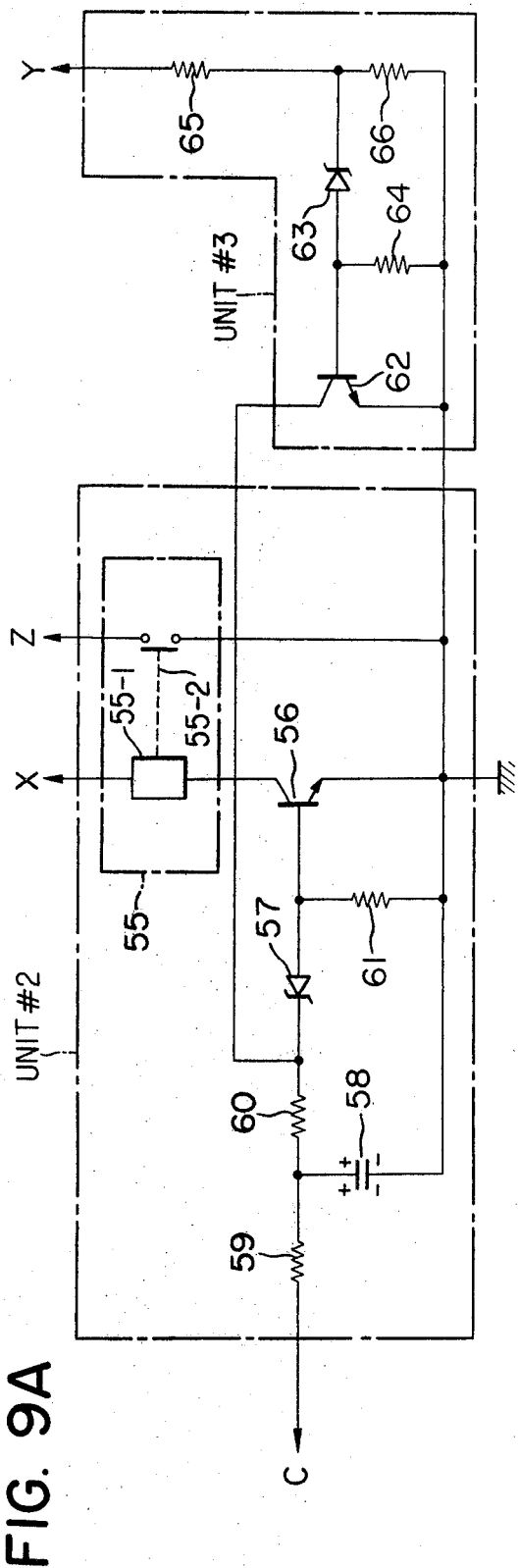
FIG. 9A is a circuit diagram of a controlling means which controls the isolating means connected to terminals X, Y, Z and C in FIGS. 8 and 10.
Figure 9B:
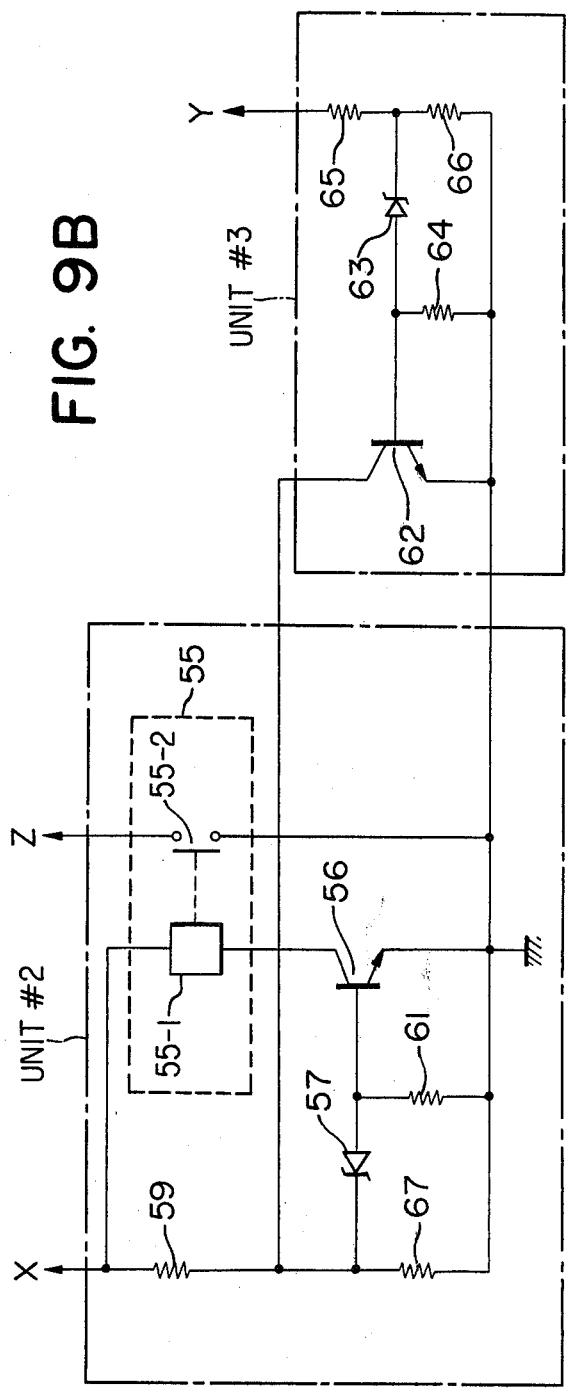
FIG. 9B is a circuit diagram of another example of the controlling means which also controls the isolating means connected to terminals X, Y and Z in FIGS. 8 and 10.

FIG. 8 shows an embodiment of this invention constructed by combining the generator 1 shown in FIG. 6 and an example of control circuit shown in FIG. 9A or another example of control circuit shown in FIG. 9B. The figure also shows an arrangement in which the isolating means 38 is opened when the voltage generated in the generator 1 is less than a predetermined level, and on the other hand, the charging voltage of the auxiliary battery 4 is detected and when the charging voltage exceeds another predetermined level, which is different from that mentioned above, the isolating means 38 is opened to prevent the auxiliary battery 4 from overcharging. In the following, description will be made on an embodiment of this invention constructed by the circuits shown in FIGS. 8 and 9A, and on another embodiment of this invention constructed by the circuits shown in FIGS. 8 and 9B.

In FIGS. 8 and 9A, #2 unit is an controlling portion of isolating means, #3 unit is a voltage detecting portion of auxiliary battery which controls the isolating means 38 together with the controlling portion of isolating means #2 unit, numeral 55 refers to a relay circuit comprising a relay winding 55-1 and a relay contact 55-2, one end of the relay winding 55-1 being connected to the terminal X shown in FIG. 8, and one end of the relay contact 55-2 being connected to the terminal Z shown in FIG. 8. Numeral 56 is a first semiconductor switching element, for example a transistor, 57 is a first Zener diode having a Zener voltage corresponding to a prescribed voltage generated by the generator 1, 58 is a capacitor, 59 through 61 are resistors, 62 is a second semiconductor switching element, for example, a transistor, 63 is a second Zener diode having a Zener voltage corresponding to a prescribed charging voltage of the auxiliary battery 4, 64 through 66 are resistors. Other numerals refer to those represented by like numerals in FIG. 5.

As the engine starts its operation and the voltage generated in the generator 1 increases, the charging voltage of the capacitor 58 increases and exceeds the Zener voltage of the first Zener diode 57. Then, the first Zener diode 57 turns on into a conducting state and the first transistor 56 is turned on. As the first transistor 56 is turned on, current is fed to the relay winding 55-1 of the relay circuit 55 and the relay contact 55-2 is closed. That is, an electric circuit from the terminal X shown in FIG. 8 to the ground through the relay winding 40 of the isolating means 38 and the relay contact 55-2 of the relay circuit 55 is closed and current is fed to the relay winding 40 of the isolating means 38 to make the relay contact 39. Thereby, the voltage generated in the generator 1 reaches the prescribed level and the relay contact 39 of the isolating means 38 is closed to make the electric circuit between the main and auxiliary batteries 3 and 4. The supply voltage to the auxiliary battery 4 is boosted by the d-c booster circuit #1 unit and the auxiliary battery 4 is charged as long as the voltage generated in the generator 1 is more than the prescribed level. When the revolution of engine is decreased or stopped and the voltage produced in the generator 1 drops to less than the prescribed level, the first Zener diode 57 is turned off, and thereby the electric circuit between the main and auxiliary batteries 3 and 4 is opened. On the other hand, as long as the generator 1 is in steady operation and the d-c booster circuit #1 unit is operated to boost the supply voltage to the auxiliary battery 4, a current proportional to the potential on the terminal Y shown in FIG. 8 flows from the terminal Y to the ground through the resistors 65 and 66 of the voltage detecting portion of auxiliary battery #3 unit shown in FIG. 9A. In other words, #3 unit is watching the voltage on the terminal Y and the protector for overcharging on the auxiliary battery 4, too. With an increase in the potential on the terminal Y, the above-mentioned current increases and the voltage across the resistor 66 exceeds the Zener voltage of the second Zener diode 63, then the second Zener diode 63 is turned on, and the second transistor 62 is also turned on. In this way, as the second transistor 62 is turned on, the first Zener diode 57 which has been in ON state is now turned off, and thereby the first transistor 56 is switched from ON state to OFF state.

Consequently, the current supply from the generator 1 to the d-c booster circuit #1 unit is discontinued and the d-c booster circuit #1 unit stops its oscillation. In this way, when the voltage of the auxiliary battery 4 exceeds the prescribed level corresponding to the Zener voltage of the second Zener diode 63, the d-c booster circuit #1 unit does not operate, and thereby the voltage of the auxiliary battery 4 cannot exceed the prescribed level.

An embodiment of the present invention consisting of circuits shown in FIGS. 8 and 9B has a construction in which the terminal X shown in FIG. 8 is connected to the resistor 59 of the controlling portion of isolating means #2 unit and the relay winding 55-1, and a resistor 67 is used in place of the capacitor 58 shown in FIG. 9A. Other numerals in the figure correspond with like numerals in FIG. 9A.

In this embodiment, the terminal C shown in FIG. 9A is connected to the terminal X in FIG. 8, and the second rectifier circuit 45 in the generator 1 shown in FIG. 6 is not used. If the main battery 3 is of 12-v system in this embodiment, the voltage on the terminal X is approx. 13.5 v to 15.5 v as long as the generator 1 generates the prescribed voltage, and the voltage on the terminal X drops to approx. 12 v when the generator 1 stops. Then the Zener voltage of the first Zener diode 57 is selected in advance so as to detect those voltages in cases the generator 1 is operated and stopped.

FIG. 10 shows an embodiment of this invention constructed by using the generator 1 shown in FIG. 6 and connecting an example of control circuit shown in FIG. 9A or another example of control circuit shown in FIG. 9B. As in the embodiment shown in FIG. 8, this embodiment has a construction in which the isolating means 38 remains in ON state so long as the voltage generated in the generator 1 is more than the prescribed level while the auxiliary battery 4 is prevented from overcharging.

In this embodiment, the isolating means 38 comprises transistors 68 and 69, which are Darlington connected, and controlling resistor 70. The transistors 68 and 69 are controlled by the above-mentioned controlling portion of isolating means #2 unit (FIG. 9A or FIG. 9B) and the voltage detecting portion of auxiliary battery #3 unit (FIG. 9A or FIG. 9B), and are turned on when the voltage generated in the generator 1 is more than the first prescribed level and are turned off when the voltage of the auxiliary battery 4 exceeds the second prescribed level, and boost the voltage of the auxiliary battery 4 as well as prevent the auxiliary battery 4 from overcharging. This function is same as the embodiment of FIG. 8.

FIG. 11 shows an embodiment of this invention comprising a controlling portion of d-c booster circuit #4 unit for controlling the oscillation of the d-c booster circuit #1 unit and an detecting portion of auxiliary battery #3 unit for controlling the controlling portion of d-c booster circuit #4 unit, wherein the oscillation of the d-c booster circuit #1 unit is stopped to prevent the auxiliary battery 4 from overcharging when the supply voltage to the auxiliary battery 4 exceeds the prescribed level.

In FIG. 11, #4 unit is a controlling portion of d-c booster circuit, numeral 71 is a controlling transistor for controlling the oscillation of transistors 10 and 11. 72 is a transistor, 73 through 75 are resistors, and other numerals refer to those represented by like numerals in FIGS. 2 and 9A.

When the generator 1 produces voltage, current flows in the circuit from the generator 1 through the terminal X shown in the figure, the breaker 27, ther resistor 75 of the controlling portion of d-c booster circuit #4 unit, the resistor 73 and the ground, returning to the generator 1. Then the transistor 72 and the controlling transistor 71 are turned on by the voltage across the resistor 73 as shown in the figure. Consequently, the circuit configuration of the d-c booster circuit #1 unit is the same as that shown in FIG. 2 as long as the controlling transistor 71 is in ON state. That is, the d-c booster circuit #1 unit is operated to boost the supply voltage to the auxiliary battery 4, as described in the embodiment shown in FIG. 2. In other words, the supply voltage to the auxiliary battery 4 is a sum of the center tap voltage of the secondary winding 14 and the induced voltage in the upper or lower part in the figure of the secondary winding 14.

On the other hand, during the period in which the d-c booster circuit #1 unit is operated, as described above, the voltage applied to the Zener diode 63 of the voltage detecting portion of auxiliary battery #3 unit exceeds the Zener voltage due to increasing the voltage of terminal Y, then the Zener diode 63 is turned on, and the transistor 62 is switched from OFF state to ON state. When the transistor 62 is turned on, the base potential of the transistor 72 almost equals to the ground potential and the voltage across the resistor 73 approaches to zero. This switches the transistor 72 and the controlling transistor 71 from ON state to OFF state. That is, the electric circuit between the emitters of the transistors 10 and 11 of the d-c booster circuit #1 unit and the anodes of the diodes 19 and 20 is disconnected, and thereby the base current circuit of the transistors 10 and 11 is opened, resulting in the discontinuation of the oscillation of the transistors 10 and 11. Consequently, no voltage is induced in the secondary winding 14, and the supply voltage to the auxiliary battery 4 is supplied only by the center tap voltage of the secondary winding 14.

Figure 12:
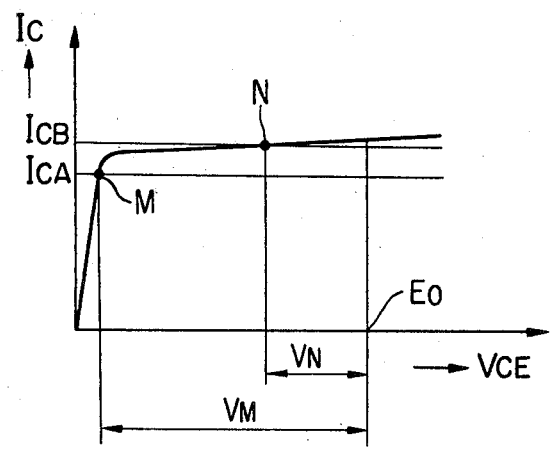
FIGS. 12 and 13 illustrate explanatory diagrams explaining an embodiment of this invention in which a drooping characteristic is given to the d-c booster circuit in the embodiment of FIG. 2.
Figure 13:
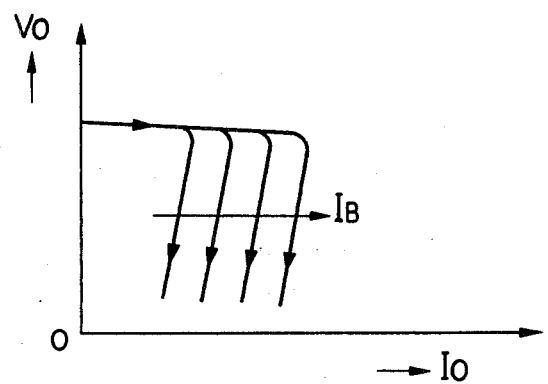

FIGS. 12 and 13 are illustrations explaining an embodiment of this invention having the same circuit configuration as that in FIG. 2 or FIG. 3, in which an arrangement is made to protect the d-c booster circuit #1 unit shown in FIG. 2 or FIG. 3 from over current by providing the d-c booster circuit #1 unit with a droop characteristic. In the following, description will be made referring to FIG. 2.

Assuming the load current, i.e., the current flowing in the secondary winding 14 increases due to the shortcircuit of automotive d-c equipment 5, and the transistor 10 is in ON state and the transistor 11 is in OFF state, a circuit current flowing in the direction shown by solid line arrows in the figure, then the current in the primary winding 13 or the collector current of the transistor 10 tends to increase with the increase in the current of the secondary winding 14. In this invention, however, taking into consideration the fact that the collector current $I_C$ - collector-emitter voltage $V_{CE}$ characteristic of the transistors has such a characteristic as shown in FIG. 12 at a given base current of $I_B$, the value of the base current for the transistors 10 and 11 is set so that the transistors operate at the point M shown in FIG. 12 when the rated load current $I_L$ (which is equal to the collector current $I_C$ shown in FIG. 12 assuming the transformer windings ratio is 1 to 1) flows in the auxiliary battery 4. In this state, that is, in the state in which the current less than the rated value is supplied, the voltage applied to the primary winding 13 of the transformer is more than $V_M$ as shown in FIG. 12. Thus, a sufficiently high voltage, in addition to the voltage on the point X shown in FIG. 2 is applied to the auxiliary battery 4. As has been described above, if the load current exceeds the above-mentioned rated load current $I_L$ to the extent that the collector current, for example, approaches to $I_{CB}$ shown in FIG. 12, the transistors 10 and 11 begin to operate at the point N as shown in FIG. 12, and thereby the voltage applied to the primary winding 13 becomes $V_N$. That is, the voltage applied to the primary winding 13 of the transformer and the voltage induced in the secondary winding 14 sharply decrease.

The above description is based on the assumption that the base current $I_B$ of the transistors 10 and 11 is constant. However, since the base current $I_B$ decreases as the voltage applied to the primary winding 13 of the transformer as well as the voltage induced in the feedback winding 15 drop, the output voltage (the voltage induced in the secondary winding 14 of the transformer) with respect to the load current assumes curves shown in FIG. 13.

Thus, the d-c booster circuit #1 unit exhibits a droop characteristic, and therefor is never burnt out even when the load current exceeds the rated current.

What is claimed is:

1. An automotive power supply comprising
   a generator which generates voltage when an engine is operated,
   a main battery which drives a starter motor, and
   an auxiliary battery which acts as a power source for automotive d-c equipment, the main and auxiliary batteries being charged in parallel by the generator, wherein an isolating means and a d-c booster circuit are provided between the main and auxiliary batteries so as to charge the auxiliary battery by boosting the supply voltage to the auxiliary battery during the operation of the engine and to isolate the electric circuit between the two batteries when the engine is stopped, wherein the d-c booster circuit comprises a separately excited inverter circuit.

2. An automotive power supply set forth in claim 1 wherein the separately excited inverter circuit comprises an oscillator, transistors which repeat on and off operations alternately triggered by signals generated by the oscillator, and a capacitor which repeats charging and discharging in accordance with the on-off operations of the transistors.

3. An automotive power supply set forth in claim 1 wherein breakers for preventing the reversed connection of batteries are provided between the main battery and the d-c booster circuit and between the auxiliary battery and the d-c booster circuit.

4. An automotive power supply comprising
   a generator which generates voltage when an engine is operated,
   a main battery which drives a starter motor,
   an auxiliary batter which acts as a power source for automotive d-c equipment, and
   a d-c booster circuit having at least one semiconductor element, the main and auxiliary batteries being charged in parallel by the generator, wherein an isolating means and the d-c booster circuit are provided between the main and auxiliary batteries so as to charge the auxiliary battery by boosting the supply voltage to the auxiliary battery during the operation of the engine and to isolate the electric circuit between the two batteries when the engine is stopped, and wherein the semiconductor element is determined so as to perform switching in the level at which the voltage drop in the element is substantially zero when the output current of the d-c booster circuit is less than the rated current and to perform switching in the level at which the voltage drop in the element is substantially not zero when the output current of the d-c booster circuit is more than a predetermined current.

5. An automotive power supply set forth in claim 4 wherein the isolating means comprises a controlled type isolating means which is controlled by an external controlling means.

6. An automotive power supply set forth in claim 5 wherein the controlled type isolating means is directly controlled by an ignition switch connected with the output terminal of the generator.

7. An automotive power supply set forth in claim 5 wherein the controlled type isolating means is directly controlled by the votage from another output terminal additionally provided on the generator.

8. An automotive power supply set forth in claim 5 wherein the external controlling means comprises a controlling portion of isolating means controlled by the battery voltage.

9. An automotive power supply set forth in claim 5 wherein the controlled type isolating means comprises mechanical contacts.

10. An automotive power supply set forth in claim 5 wherein the controlled type isolating means comprises transistors which are Darlington connected.

11. An automotive power supply comprising
    a generator which generates voltage when an engine is operated,
    a main battery which drives a starter motor, and
    an auxiliary battery which acts as a power source for automotive d-c equipment and which has substantially the same terminal voltage as the main battery, the main and auxiliary batteries being charged in parallel by the generator, wherein an isolating means and a d-c booster circuit are provided between the main and auxiliary batteries so as to charge the auxiliary battery by boosting the supply voltage to the auxiliary battery during the operation of the engine and to isolate the electric circuit between the two batteries when the engine is stopped, and wherein the d-c booster serves to compensate the wire drop between the main battery and the auxiliary battery; said d-c booster circuit comprising a self-excited inverter circuit and
    wherein the d-c booster circuit has at least one semiconductor switching element, said semi-conductor switching element being determined so as to perform switching in the level at which the voltage drop in the element is substantially zero when the output current of the d-c booster circuit is less than the rated current and to perform switching in the level at which the voltage drop in the element is subatantially not zero when the output current of the d-c booster circuit is more than a predetermined current.

12. An automotive power supply set forth in claim 11 wherein the self-excited inverter circuit comprises two series-connected transistors which repeat on and off operations alternately, and an output transformer having a primary winding series-connected with the two transistors, a feedback winding controlling the base current of the two transistors and a secondary winding in which voltage is induced by the current fed to the primary winding.

13. An automotive power supply set forth in claim 11 wherein the self-excited inverter circuit comprises a transistor which repeats on and off operations and output transformer having the primary winding, the feedback winding and the secondary winding; the primary winding and the feedback winding being series-connected.

14. An automotive power supply set forth in claim 11 wherein the isolating means comprises diodes.

15. An automotive power supply set forth in claim 11 wherein breakers for preventing the reversed connection of batteries are provided between the main battery and the d-c booster circuit and between the auxiliary battery and the d-c booster circuit.

16. An automotive power supply comprising
 a generator which generates voltage when an engine is operated,
 a main battery which drives a starter motor, and
 an auxiliary battery which acts as a power source for automotive d-c equipment, the main and auxiliary batteries being charged in parallel by the generator, wherein an isolating means and a d-c booster circuit are provided between the main and auxiliary batteries so as to charge the auxiliary battery by boosting the supply voltage to the auxiliary battery during the operation of the engine and to isolate the electric circuit between the two batteries when the engine is stopped, wherein a controlling portion of d-c booster circuit which controls the oscillation of the d-c booster circuit and the voltage detecting portion of auxiliary battery are provided, and the isolation of the d-c booster circuit is controlled by the results detected by the voltage detecting portion of auxiliary battery.

* * * * *